(No Model.) 3 Sheets—Sheet 1.
P. HERPOLSHEIMER.
THRASHING MACHINE.
No. 539,177. Patented May 14, 1895.
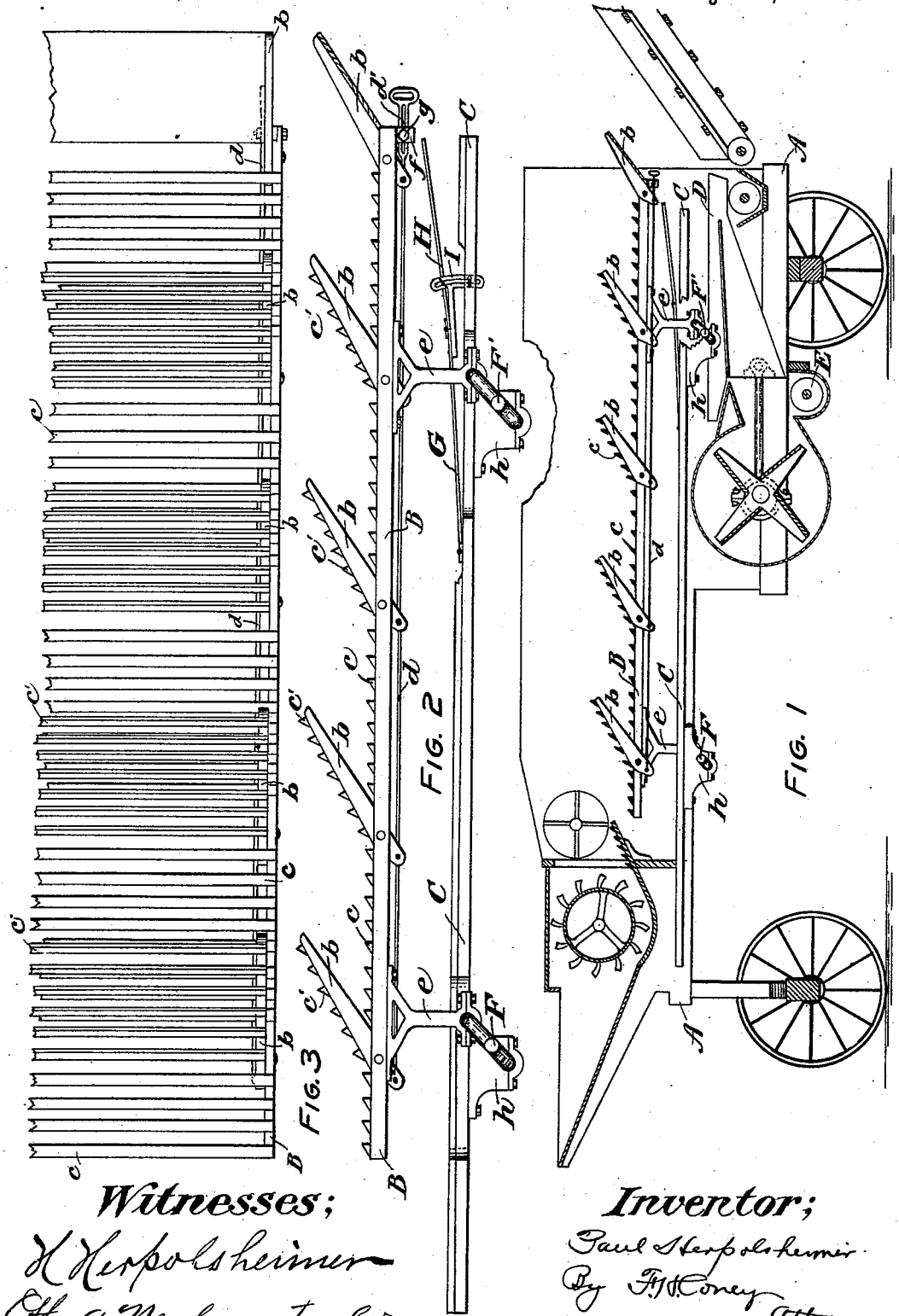
Witnesses:
H. Herpolsheimer
Otto A. Mohrenstecher
Inventor:
Paul Herpolsheimer
By F. H. Coney
Atty.

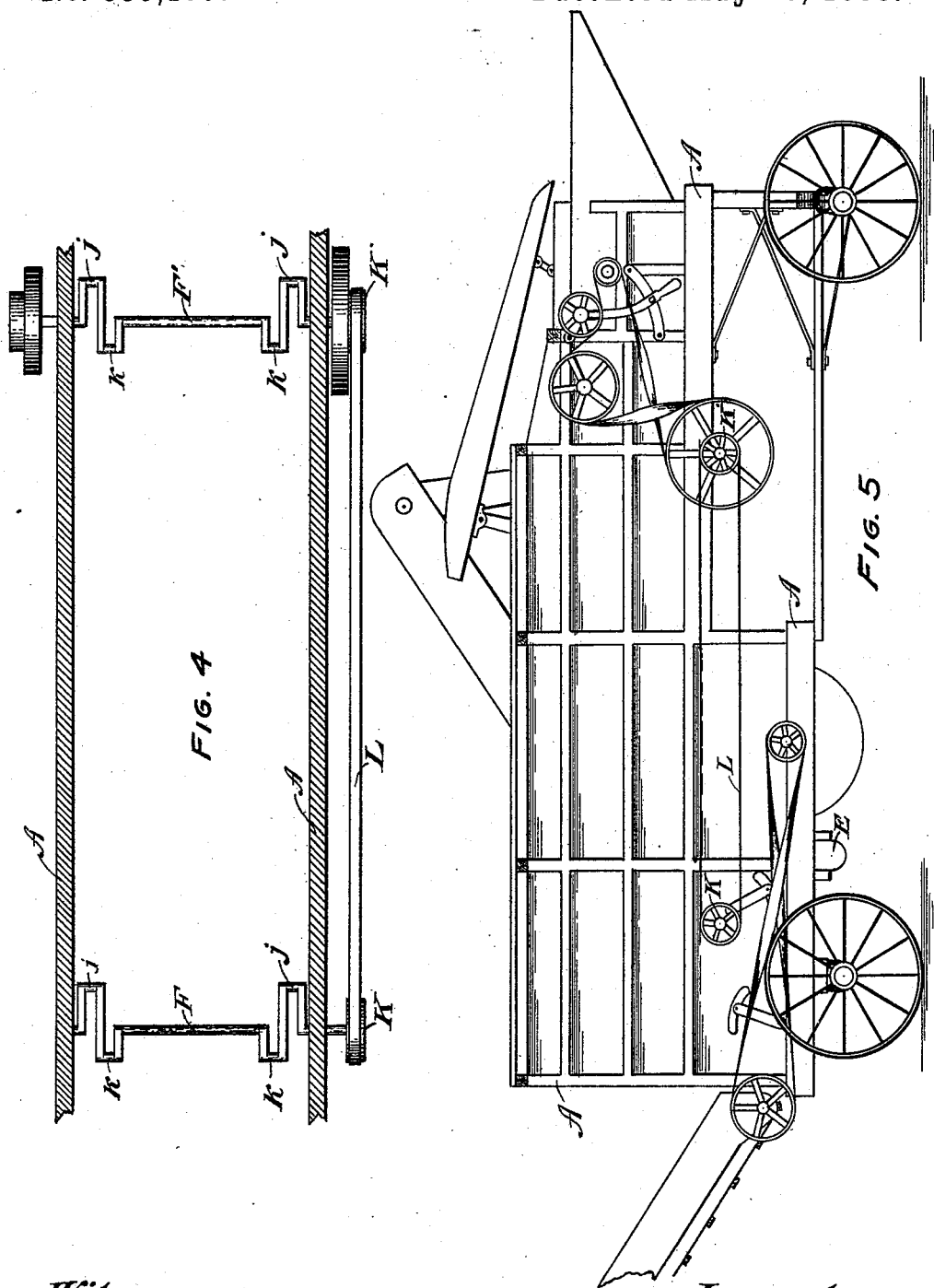

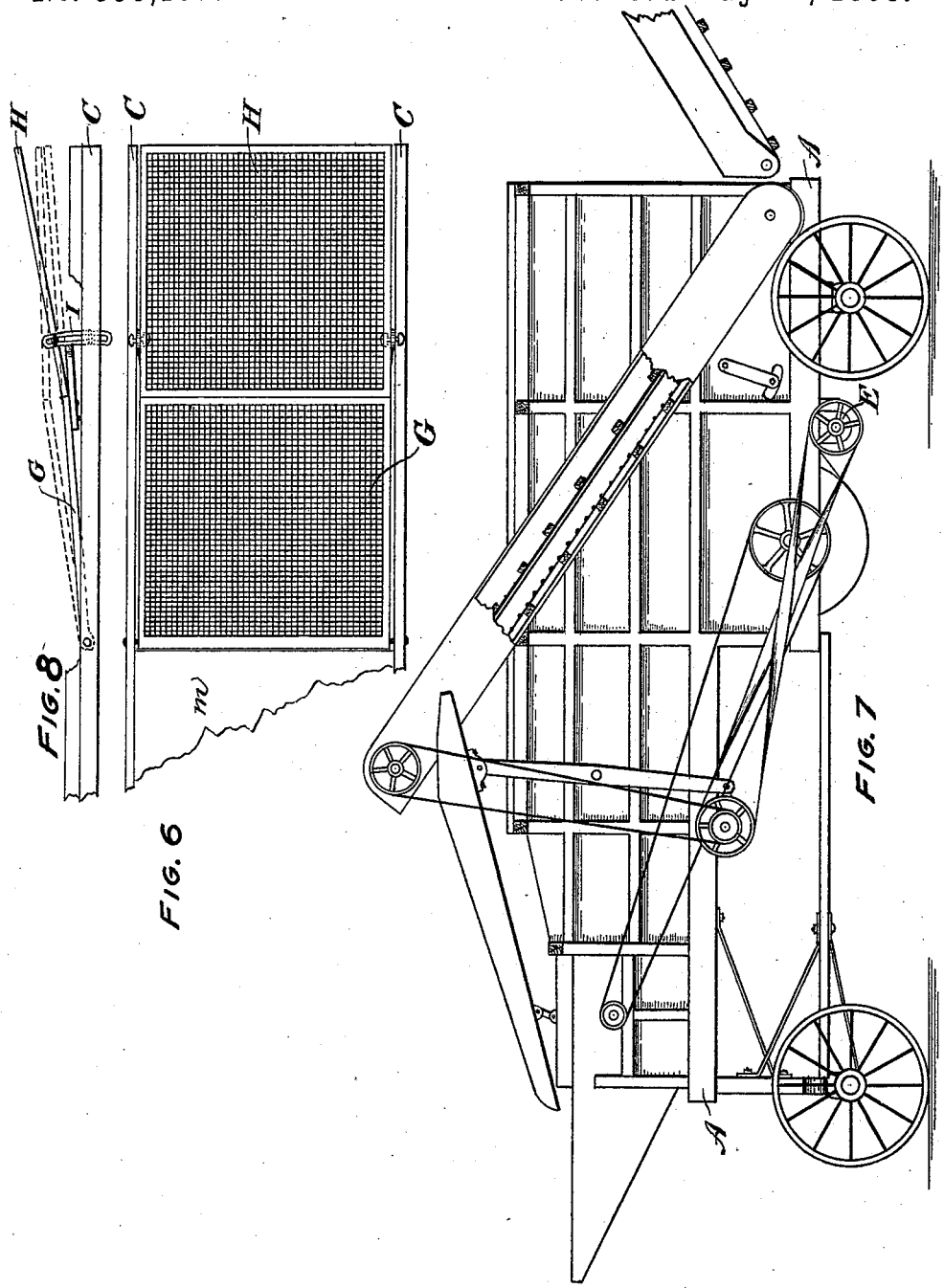

UNITED STATES PATENT OFFICE.

PAUL HERPOLSHEIMER, OF LINCOLN, NEBRASKA.

THRASHING-MACHINE.

SPECIFICATION forming part of Letters Patent No. 539,177, dated May 14, 1895.

Application filed July 20, 1893. Serial No. 481,070. (No model.)

*To all whom it may concern:*

Be it known that I, PAUL HERPOLSHEIMER, a citizen of the United States, residing at Lincoln, in the county of Lancaster and State of Nebraska, have invented certain new and useful Improvements in Thrashing-Machines, which invention or improvements are fully set forth and illustrated in the following specification and accompanying drawings.

My invention relates to improvements in that class of thrashing machines having a horizontal straw rack and a horizontal grain conveyer, or grain pan, each of which are usually so constructed as to be capable of a longitudinal vibratory or reciprocating motion.

The objects of my invention are, first, to effect a more thorough separation of the grain from the straw and to reduce to a minimum, the quantity of grain carried off with the straw; second, to more thoroughly clean the grain. I attain these objects by the mechanism and combination of parts illustrated in the accompanying drawings, in which—

Figure 1 is a longitudinal section of as much of a thrashing-machine as is necessary to show my improvements. Fig. 2 is a side elevation of the straw-rack and grain-conveyer removed from the machine. Fig. 3 is a half plan view of the straw-rack. Fig. 4 is a plan view showing the crank-shafts F F' for operating the straw-rack and grain-conveyer, the sides or frame of the machine being shown in section in this view. Figs. 5 and 7 are elevations of the machine. Fig. 6 is a plan view of part of the grain-conveyer, showing the conveyer-sieves. Fig. 8 is a side elevation of the same parts shown in Fig. 6.

A indicates the frame of the machine which may be of any usual construction.

The straw rack is composed of two longitudinal strips B, the arms $b$ pivoted to said longitudinal strips B, the transverse strips $c$, $c'$, triangular in cross section, secured to the longitudinal strips B and the arms $b$, the rods $d$ and the bearing brackets $e$.

The straw and grain are received by the straw rack after passing under the cylinder and beater. The straw is conveyed by the straw rack to the rear of the machine and there delivered to the stacker. During the time of its conveyance it is thoroughly shaken by the motion of the said straw rack, thus causing the grain to fall through into the grain conveyer.

C indicates the grain conveyer which receives the grain, chaff, &c., escaping through the straw rack, and from which it escapes to the shoe D and thence to the conveyer E which carries it out of the machine.

F F' indicate two horizontally arranged shafts mounted in suitable bearings in the frame A. These shafts F F' are for the purpose of imparting suitable motion to both the straw rack and the grain conveyer. This is accomplished in the following manner: The straw rack is provided with four bearing brackets $e$ extending downward from the straw rack a suitable distance, and connected with the cranks $j$ of the shafts F F'. The grain conveyer is similarly connected with the cranks $k$, of the same shafts F F', by means of the bearings $h$. The synchronous revolution of the shafts F F', connected as shown and described, give a movement to the straw rack and grain conveyer similar to the movements of the rods connecting the driving wheels of an ordinary locomotive. This motion is peculiarly suited to this purpose, as both the straw and grain will receive a more thorough and effective shaking than with the vibrating movement usually given these parts in machines as now constructed; and further, this rotary motion is less injurious to the framework of the machine, than the vibratory motion, as producing less jar and strain on the parts and therefore rendering the machine more durable. A saving in the power required to operate the machine is also effected by this arrangement. I have shown the cranks $j$, $k$ as directly opposite each other on the shafts F F'. They can be arranged differently but I prefer this way. I have also shown the shafts F and F' as connected by means of the pulleys K and K' and the belt L. This is to insure a simultaneous movement of both shafts and can be accomplished by means of cranks and connecting rod in place of pulleys and belt, if preferred. If the cranks $j$ and $k$ on the shafts F and F' are placed at right angles to each other on the said shafts, no other belt or rod connection will be necessary.

To suit the varying conditions of straw, I make the straw rack with the inclined sections, composed of the arms $b$ and slats $c'$, adjustable. These are made rigid in the machines as now constructed. The arms $b$ are pivoted to the strips B so as to allow of a rotary movement of said arms $b$. These sections may be made so as to be adjusted independent of each other or may all be connected as shown in Fig. 2, to-wit, by a rod $d$ connected to the lower part of the radial arms $b$, so that by moving the rod $d$ the angle of inclination of the sections will be altered.

I have shown the rod $d$ as having a slot $d'$ near its rear extremity. A bolt $g$ is placed through said slot $d'$ and also through lug $f$ attached to longitudinal strip B. By tightening the nut on said bolt $g$ the rod $d$ is firmly clamped to lug $f$ and the sections are thereby kept from moving independent of the balance of the straw rack. The slot $d'$ admits of a longitudinal movement of the rod $d$ and thereby a rotary movement of the arms $b$.

The grain conveyer consists of the sides C, which are shown as partially broken away, in Figs. 2 and 8, the closed bottom $m$ and the sieves G and H. Sieves G and H are over the shoe D when these parts are in position in the machine. These sieves are made adjustable, or capable of being given different inclinations. Sieve G is hinged or pivoted at its forward edge to the sides or bottom of the grain conveyer and sieve H is hinged at its forward edge to the rear edge of sieve G. With this construction the sieves can be inclined at different angles with each other and with the bottom of the conveyer, as shown in Fig. 8 by both solid and broken lines, to suit the varying conditions of grain and various kinds of grain.

The sieve G may be given a certain angle of inclination and the sieve H be adjusted in a horizontal position. This arrangement will retard the rearward movement of the grain over the sieve G but not over sieve H. In light grain, where there is a great quantity of chaff, this arrangement is particularly desirable. For different conditions and kinds of grain, different arrangements of the sieves can be made.

For the purpose of holding the sieves in position, a link or slotted arm I is rigidly secured to the frame of sieve G. Passing through the slot in said arm I, and into the side C of the conveyer, is a thumb screw. By tightening this thumb screw sieve G is firmly clamped in position. Through the same slot in arm I a similar thumb screw passes into the frame of sieve H. Tightening this thumb screw serves to clamp the sieve H in position. This adjustment of the sieves in different positions may be accomplished in various ways.

The arrangement of parts of the machine not herein particularly described may be similar to that of machines now in use.

Having now fully described my improvement, what I claim as of my invention, and desire to secure by Letters Patent, is—

In a thrashing machine, a straw rack consisting of longitudinal strips B, transverse strips $c$ secured to said longitudinal strips B, arms $b$ pivoted to and capable of being adjusted at different angles of inclination with relation to said longitudinal strips B, transverse strips $c'$ secured to said arms $b$, rod $d$ connected with the arms $b$, means for securing said rod $d$ to said longitudinal strips B, and bearing brackets $e$, substantially as shown.

PAUL HERPOLSHEIMER.

Witnesses:
H. HERPOLSHEIMER,
OTTO A. MOHRENSTECHER.